No. 878,439. PATENTED FEB. 4, 1908.
A. WAGNIERE.
MEASURING AND GAGING TOOL.
APPLICATION FILED NOV. 19, 1906.
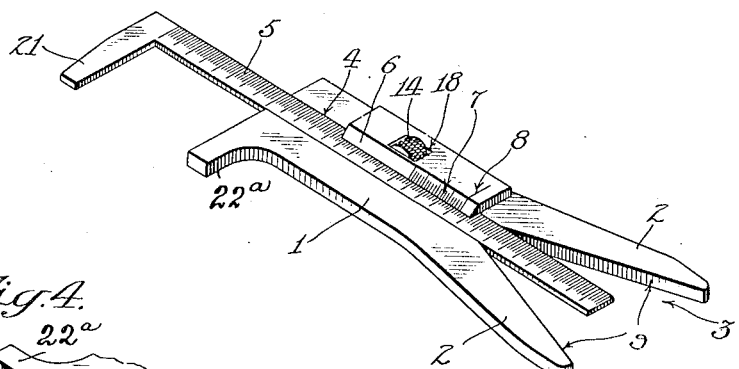
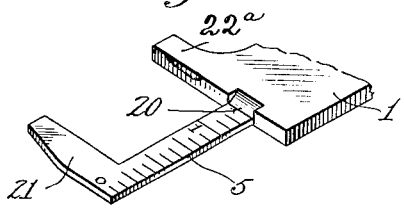
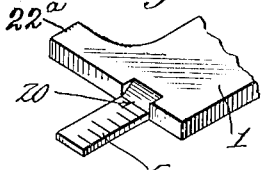
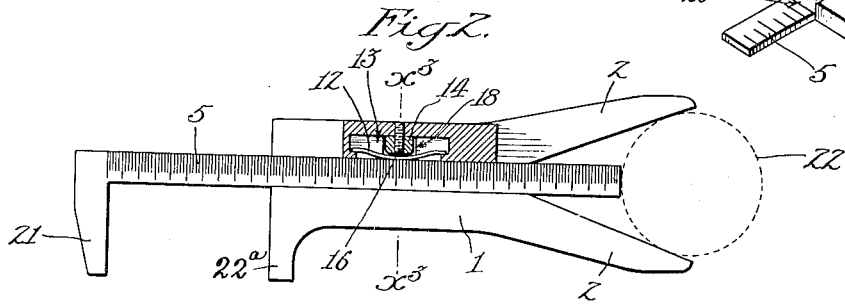
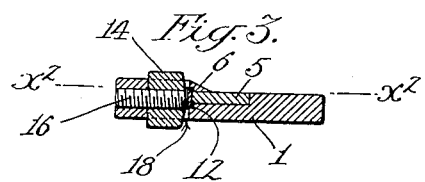
Witnesses:—
Frank L. A. Graham
Geneva L. Smith
Inventor,
August Wagniere.
By Townsend, Lyon, Hackley & Knight
his Attys

UNITED STATES PATENT OFFICE.

AUGUST WAGNIERE, OF LOS ANGELES, CALIFORNIA.

MEASURING AND GAGING TOOL.

No. 878,439.  Specification of Letters Patent.  Patented Feb. 4, 1908.

Application filed November 19, 1906. Serial No. 344,158.

*To all whom it may concern:*

Be it known that I, AUGUST WAGNIERE, a citizen of the United States of America, residing at Los Angeles, in the county of Los Angeles and State of California, have invented a new and useful Measuring and Gaging Tool, of which the following is a specification.

The main object of the present invention is to provide a simple and accurate gage for determining the dimensions of round or cylindrical bodies, for example metal rods or wires.

A further object of the invention is to provide a gage of this character which can also be used as a depth gage.

Another object of the invention is to provide a gage of this character which can also be used as a thickness gage.

In the accompanying drawings:—Figure 1 is a perspective of the tool. Fig. 2 is a section on line $x^2$ in Fig. 3. Fig. 3 is a section on line $x^3$ in Fig. 2. Fig. 4 is a perspective of the rear end of the tool inverted. Fig. 5 is a perspective of the rear end of the tool inverted; the scale member being reversed end for end.

The gage comprises a body 1 having arms, jaws or extensions 2 projecting in oblique, longitudinally diverging directions to form a contracted V shaped notch 3. Said body has also a groove or slot 4 extending longitudinally therein, the center of said groove being in line with the median line of the said notch. In this slot or groove fits and works a slide or scale member 5, graduated in any desired units. The said slide is held in the slot or groove by means of a longitudinal face plate or shoulder member 6 formed on or attached to one side of the body 1 and extending over the slot or groove so that the said shoulder member coöperates with the groove portion of the body to form a way in which the scale member is guided. The body 1 or shoulder member 6, is provided with an index line or mark 8 coöperating with the marks or divisions of the scale member to indicate the longitudinal position of the scale member. Vernier marks 7 may also be provided. The inward taper or convergence of the inner faces or edges 9 of the arms 2 is such that when a round or cylindrical body is placed between such faces, the distance between the point of intersection of the lines of such faces and the surface of such body will represent the diameter of such body. Expressed geometrically, the perpendicular distance from the point of intersection of these faces to any circle tangent to the faces is equal to the diameter to the circle. Means are provided for holding the scale member frictionally in longitudinal position, such means comprising a leaf spring 12 extending in a recess 13 in the body 1 and pressing against one edge of the scale member. Means are preferably provided for clamping the scale member in any position, said means comprising a member 14 in the form of a nut turning and screwing on a screw threaded pin or stud 16, said nut extending to the outside of the body member 1 through a transverse opening 18 in said body member and being milled on its circumference to enable it to be rotated. The said nut acts as a pressure head engaging with the adjacent face or edge of the scale member to press it against the opposite wall of the slot or groove 4 to bind the said scale member firmly in place.

Scale member 5 may be formed with marks of different dimensions on the two sides thereof and may be turned so as to bring one side or the other uppermost for measurement. The said scale member may also be reversed end to end, one end thereof being adapted to be inserted into a hole or depression to serve as a depth gage, the back of the body 1 being beveled as at 20 to enable accurate reading on the back face of the scale. The other end of the scale may be provided with an outer caliper arm or head 21 extending laterally so as to enable measurement for thickness between such outer caliper arm and an inner caliper arm or head 22 on the rear end of the body 1.

The device is used as follows:—Assuming that a cylindrical body, for example, that a finished steel rod, pin or shaft, indicated at 22, is to be measured, the scale member 5 is pushed forward toward the front open end of the measuring arms or jaws 2 and the said cylindrical body is then placed against the front end of the scale member and pushed inwardly until it strikes the inwardly converging edges or faces 9 of the jaws or arms 2. In this inward movement it will press the scale member 5 rearwardly, and when the body to be measured comes to rest against the inner faces of the arms 2, the outer end of said scale member will be at a distance from the mark or index 8 equal to the diameter of the said body, so that by reading the scale member with reference to said marks a direct reading is obtained of the diameter of the body. By selecting the proper angle for the divergence of the measuring jaws, the distance to which the scale is pushed back from the mark or index 8 may be made just equal to the diameter of the body to be measured, the graduations on the scale being then of the actual length of the units in which the measurement is made, thus enabling the ordinary scale graduations to be used, and practically the same graduations to be used in direct reading on the caliper. The proper angle for this purpose I have found to be 38°, 56′, 31.1″.

What I claim is:—

1. A measuring and gaging tool comprising a body formed with arms at its forward end having their inner faces extending divergently from the body at an acute angle thereto providing a contracted V shaped notch, and with an inner caliper head at the rear end of the body and a scale member having an outer caliper head and mounted on the body and adapted to slide longitudinally thereof between the arms; the body and the scale member being graduated for measuring the movement of the scale member.

2. A measuring and gaging tool comprising a body formed with arms at its forward end having their inner faces extending divergently from the body at an angle thereto so that the shortest distance from the point of intersection of said faces to any circle tangent to the faces is equal to the diameter of said circle and with an inner caliper head at the rear end of the body and a scale member having an outer caliper head and mounted on the body and adapted to slide longitudinally thereof between the arms; the body and the scale member being graduated for measuring the movement of the scale member.

In testimony whereof, I have hereunto set my hand at Los Angeles, California, this 9th day of November 1906.

AUGUST WAGNIERE.

In presence of—
ARTHUR P. KNIGHT,
FRANK L. A. GRAHAM.